United States Patent [19]

Higuchi et al.

[11] Patent Number: 5,060,097
[45] Date of Patent: Oct. 22, 1991

[54] MAGNETIC DISC FILE INCLUDING A SLIDER WHICH EXHIBITS REDUCED DEFORMATION DURING OPERATION

[75] Inventors: Shinsuke Higuchi; Takeshi Miyazaki; Akihiro Gotoh; Kunihiro Maeda, all of Hitachi; Yokuo Saitoh, Kanagawa, all of Japan

[73] Assignee: Hitachi, Ltd., Tokyo, Japan

[21] Appl. No.: 460,513

[22] Filed: Jan. 3, 1990

[30] Foreign Application Priority Data

Jan. 6, 1989 [JP] Japan .................................. 64-331
Jun. 16, 1989 [JP] Japan .................................. 1-154041

[51] Int. Cl.$^5$ .......................... G11B 5/60; C04B 33/00
[52] U.S. Cl. .................................... 360/103; 501/151
[58] Field of Search .................. 360/103, 135; 501/151

[56] References Cited

U.S. PATENT DOCUMENTS

| | | | |
|---|---|---|---|
| 4,649,448 | 3/1987 | Nakajima | 360/122 |
| 4,651,242 | 3/1987 | Hirano et al. | 360/103 |
| 4,698,251 | 10/1987 | Fukuda et al. | 360/135 |
| 4,707,756 | 11/1987 | Futamoto et al. | 360/135 |
| 4,709,284 | 11/1987 | Endo et al. | 360/103 |
| 4,803,578 | 2/1989 | Fujiwara et al. | 360/105 |
| 4,809,104 | 2/1989 | Knudsen et al. | 360/104 |
| 4,863,809 | 9/1989 | Brar et al. | 360/102 |
| 4,866,553 | 9/1989 | Kubo et al. | 360/109 |

FOREIGN PATENT DOCUMENTS

| | | |
|---|---|---|
| 0218811 | 4/1987 | European Pat. Off. . |
| 163665 | 12/1980 | Japan . |
| 82172 | 5/1982 | Japan . |
| 121179 | 7/1983 | Japan . |
| 181766 | 10/1983 | Japan . |
| 50903 | 3/1985 | Japan . |
| 54410 | 3/1985 | Japan . |
| 66402 | 4/1985 | Japan . |
| 171617 | 9/1985 | Japan . |
| 0158862 | 7/1986 | Japan . |
| 122108 | 5/1988 | Japan . |

OTHER PUBLICATIONS

Journal of the Japanese Mechanical Society, vol. 87, No. 791, Oct. 1984.
Chu et al., "Wear Behavior of Ceramic Sliders in Sliding Contact with Rigid Magnetic Thin Film Disc", Technical Report No. 90-017, Department of Material Science and Material Engineering, University of California, Jun. 1990.
Naknishi et al., The Monthly Journal of the Electrical Communication Laboratories, vol. 28, No. 10, pp. 2229-2261, 1979.
Patent Abstracts of Japan, unexamined applications, P field, vol. 9, No. 259, Oct. 17, 1985, p. 135 P 397.

Primary Examiner—David J. Severin
Assistant Examiner—Jefferson Evans
Attorney, Agent, or Firm—Antonelli, Terry, Stout & Kraus

[57] ABSTRACT

The present invention provides a magnetic disc file which comprises a thin film magnetic disc for recording information, a motor for rotating the thin film magnetic disc, a magnetic head for writing and reading information, the head being provided with a flying slider, and a carriage for supporting the magnetic head and changing the position of the head in respect of the thin film magnetic disc, the flying height of the flying slider from the thin film magnetic disc being set in the range of 0.05 to 0.15 μm, and the slider being not in contact with the thin film magnetic disc during the seeking operation on the thin film magnetic disc, the slider being a sintered body containing a metal oxide or oxides in an amount of 50 vol % or more based on the total of said body and containing 0.01 wt % to 2 wt % of fluorine based on the total of the body; a thin film magnetic head which comprises a flying slider of the same sintered body as mentioned above, and a head element formed on the surface of the slider; and a wafer for making thin film magnetic heads, which comprises the same sintered body as mentioned above.

25 Claims, 4 Drawing Sheets

MAGNETIC DISC FILE INCLUDING A SLIDER WHICH EXHIBITS REDUCED DEFORMATION DURING OPERATION

BACKGROUND OF THE INVENTION

1. Field of the Invention

The present invention relates to a magnetic disc file for use as an external store of a computer, a thin film magnetic head for use in said magnetic disc file, and a wafer for making said thin film magnetic head, more particularly to a magnetic disc file, thin film magnetic head and wafer for making said thin film magnetic head, affording a high recording density to the magnetic disc.

2. Description of Related Art

A magnetic disc file with a high speed of writing and reading information has been demanded as external store of a computer in the art. The magnetic disc file has been required to have a greater storing capacity with the amount of information to be computerized being increased. On the other hand, it is very important for sales that the size of the system is smaller. Therefore, it is required that the magnetic disc file should have a greater storing capacity, a smaller size and a higher speed of writing and reading information.

The increase of a recording density on a magnetic disc is clearly a key point for affording a greater storing capacity and smaller size to the magnetic disc.

It was already known that the reduction of the thickness of a recording medium layer is necessary to increase the recording density on the magnetic disc. That is, the magnetic head element is formed on the rear end of a flying slider, which flies with a small space maintained on the magnetic disc in writing or reading information, while a magnetic flux emitted for recording information at the end of the magnetic gap of the magnetic head element is spread in a recording medium in case the recording medium is thick. Therefore, when the recording density is to be increased, the recorded magnetic fluxes are closer to each other and have an adverse effect on each other and, as a result, a signal resolution is poor. Thus, the recording medium is required to be thinner for a high recording density. As a magnetic disc satisfying this requirement there has been a thin film magnetic disc such as a sputtering-type magnetic disc or plating-type magnetic disc. The thickness of magnetic layers of these discs can be controlled to be smaller, because the recording medium is formed by sputtering or plating. Since the recording mediums of these discs are continuous and dense, these discs have such an advantage that a relatively large recording magnetization can be obtained. However, as the recording medium is thinner, it is disadvantageous that the recording magnetization becomes smaller and the S/N is reduced. However, if the distance between the magnetic head element and the recording medium is smaller, this problem will be solved. Furthermore, the distance between the magnetic head element and the recording medium should be smaller for reducing the spread of the magnetic flux emitted at the end of the magnetic gap. Thus, in order to obtain a high recording density, it is essential that the thickness of the recording medium is not only reduced but also the distance between the magnetic head element and the recording medium is reduced, i.e., the flying height of the slider is lowered.

The structure of the slider is shown in FIG. 3. FIG. 3 is a pictorial view of a tapered flat-type magnetic head comprising a slider 12 and a magnetic head element 13. The structure of the slider will be explained below. The surface of the slider facing the magnetic disc is divided by straight or curved contours in a plurality of rails. Between the rails there is formed a predetermined amount of steps (FIG. 3 shows an example of rails divided by straight contours). In this case, the surfaces of the divided rails, i.e., the flying faces 14 have a width determined depending upon the designed flying height of the slider. The lower the flying height, the smaller the width. Furthermore, the forepart of the flying face in respect of the relative movement with the magnetic disc is cut obliquely in a forward direction with a small angle of inclination. This is hereinafter referred to as a "tapered part". A relatively great lifting power for flying is exerted on the inner edge of the tapered part and the rear end of the flying face when the magnetic disc is rotated. Therefore, in the example shown in FIG. 3, a main lifting power for flying is exerted on the two inner edges of the tapered parts and the two rear ends of the flying faces. Thus, the slider is supported at the four corners thereof. This effectively inhibits the slider from rolling and pitching, and thus maintains the slider in a stabilized flying pose. Therefore, the flying face of the slider is normally divided into a plurality of parts, which are located approximately over the entire width of the slider. Furthermore, since a larger amount of the lifting power for flying is exerted on the inner edges of the tapered parts, the forepart of the slider is more strongly pushed up. That is, the rear end of the slider is closest to the magnetic disc. Furthermore, since the end of the magnetic gap of a magnetic head element is formed on the surface of the rear end of the slider in such a manner that the end of the gap is exposed on the same plane as that of the flying faces, the above-mentioned tapered parts of the flying slider allow the end of the magnetic gap to be closest to the magnetic disc.

Now, the "flying height" of the flying slider is defined herein as a distance between the magnetic head element in a flying state and the magnetic disc, for convenience. An actual flying height is different from the set one and varies mainly depending upon parameters as mentioned below. Firstly, such difference in the flying height from the set value is based on a dimensional error in the width of the flying face of slider and an error in the force of a slider-supporting spring, secondly on vibrational fluctuation of the distance between the slider and the disc due to the warping of the disc surface, thirdly on temporal vibration of the slider when the slider rapidly moves from one position to another position (seeking movement) for writing and reading another information, and fourthly on many projections generated but yet retained after the projection-removing process by slightly sliding a so-called vanishing slider on the disc surface. The disc surface is not completely even and has many projections generated thereon. The too much removing with the vanish slider will injure the magnetic disc, so the removing is carried out in an amount varying depending upon the set flying height of the slider. However, all of the projections are not removed and, furthermore, some projections should preferably be retained in order to prevent the adsorption between the slider and the magnetic disc. The top of this projection is closer to the slider. The parameters above cause the flying height of the slider to be changed. In the present state of art that the flying height is as small as about 0.3 $\mu$m, it is estimated that the first parameter above contributes to a changed amount of about ±10%, the second parameter to a changed amount of about ±10%, the third parameter to a changed amount of about ±10%, the fourth parameter to a changed amount of about −60% to −70%. The marks "+" and "−" mean the increase and decrease of the flying height, respectively. Therefore, the tolerance width of change in decrease of flying height is only 0 to 10%, almost about 5% in the worst case.

Several hundred sliders as mentioned above are normally made from one piece of wafer at a time. The procedure are briefly shown in FIG. 4, which is a flow sheet of process steps for making a magnetic head. Firstly, (a) all magnetic head elements are formed at a time on one piece of wafer. Then, (b) this wafer is machined to be divided into individual sliders. The cut section of the slider is then subjected to the treatment such as additional machining, ion milling or etching to form a positive-pressure type flying slider (e) having a predetermined flying face. FIG. 4 also shows a negative-pressure type flying slider (d) of which two flying faces are connected at the foreparts thereof.

Various metal oxides may be used for the slider and vary depending upon the objects. A typical example of the metal oxides is $Al_2O_3$ which has a low density and a high Young's modulus. That is, a lightweight magnetic head is demanded in view of flying stability. A material having a high Young's modulus is used as a slider in order to reduce an amount of deformation during the processing. Furthermore, spinel type oxides or $ZrO_2$ materials may be used. That is, at the stage of starting or stopping the rotation of the magnetic disc, a transitionally sliding mechanism (CSS mechanism) is generally employed to work on the magnetic head and magnetic disc. Therefore, the sliding with the magnetic head is mainly contributed to by the slider of the magnetic head. Thus, as a slider material is desired a material having a low hardness not to injure the magnetic disc by sliding.

As mentioned above, various metal oxides may be used. The reasons for choosing the oxides are that such materials are inexpensive and sintering can relatively easily be carried out. Furthermore, the process steps of making a thin film magnetic head is complex, and the magnetic head is an article requiring a high precision and mass productivity. Particularly, when the wafer (substrate) undergoes damages such as chipping or dimensional deviation in finally machining a predetermined shape of slider, it is a problem that there is a large amount of loss, because the wafer was already made through the complex process steps. On the other hand, if a wafer is carefully machined so that such damages are to be reduced, it is impossible that a large amount of sliders are made within a given period of time. Therefore, a substrate which has a less amount of chippings and can be made with a high precision has been required.

Many proposals have been made to improve the above-mentioned problems, particularly on $Al_2O_3$ substrates. For example, it is disclosed in Japanese Patent KOKAI (Laid-Open) No. 61-158862. In some of the proposals, TiC and a small amount of oxides or metals are added to $Al_2O_3$, in order to improve the machinability.

Considering the future high-density magnetic recording disc file, an area recording density is required to be 100 $Mb/in^2$ or more. In order to obtain such a recording density, the flying height of the slider is required to be set to 0.05 to 0.15 $\mu m$. The flying height in this range is also effective to a negative-pressure type slider or perpendicular magnetic recording. Additional problems which have been found in prior art wafers or sliders are that there occurs such a phenomenon that the prior art sliders are deformed when machined and the edge of the rear end of the flying face of the slider goes down below the end of the magnetic head element. The thus deformed slider in a flying state is schematically shown in FIG. 5. Since the slider is deformed, it is seen that the edge of the rear end of the flying face of the slider is below the end of the magnetic head element The amount 19 of a slider 12 deformed is herein defined as being a distance from a base line connecting the two edges projected on the flying face 14 in the largest amounts to each other to the end of the magnetic head element 13 for writing and reading information. Such prior art sliders are not applicable to the case wherein the flying height is lower. In cutting the wafer, the cutting resistance of a grinder at the end thereof is not sufficiently reduced. Therefore, the cut section is curved by warping of the grinder, so that the slider is deformed. Furthermore, the cut section has a machining residual stress retained thereon due to the machining resistance. This stress can be reduced by polishing, but as shown in FIG. 3, there is a difference in the conditions of the machined slider such as the shape and surface finish thereof between the flying face side and the opposite side of the slider. Therefore, there is a difference in the amount of the machining residual stress between the two face sides. This causes the deformation of the slider. The amount of deformation is about 0.01 to 0.02 $\mu m$ in prior art. There is a tendency that the smaller the Young's modulus of the slider, the larger the amount. However, this was not a problem in prior art. If the flying height is required to be in a small range of 0.05 to 0.15 $\mu m$, however, this amount cannot be ignored. As already mentioned, the flying height of the slider, i.e., the distance between the magnetic head element and the magnetic disc surface may be changed. In the worst case, the actual flying height may be about 5% of the set value without considering the deformation of the slider at the rear end thereof. Thus, the deformed amount as shown above is at least 7% to 20% of the set flying height of 0.05 to 0.15 $\mu m$, which is clearly beyond 5%. Therefore, when the rear end of the slider is deformed, the slider may dangerously impinge on the magnetic disc. However, since a film formed on the magnetic disc is very thin, such impinging must always be avoided so as not to injure the magnetic disc.

Therefore, the deformation of the rear end of the slider as well as the above-mentioned change in the flying height of the slider must be taken into account from now. If the change in the flying height is taken into account, a tolerated deformation of the rear end of the slider is at most about 5% of the set flying height, i.e., about 0.003 to 0.008 $\mu m$, which has not yet been obtained by prior art sliders. In order to solve this problem, the structure of the slider may be considered such that the flying face is close to the center of the slider to reduce an influence from the deformation of the slider. In this case, however, the slider is susceptible to rolling during flying and thus has a problem in respect of flying stability.

SUMMARY OF THE INVENTION

One of the present invention is to solve the above-mentioned problems of slider deformation and provide a magnetic disc file in which the slider can fly in a stable state without impinging on a magnetic disc during seeking operation, the flying height of the slider from the magnetic disc is in the range of 0.05 to 0.15 μm, and the area recording density is 100 Mb/in² or more.

Another object of the present invention is to provide a thin film magnetic head in which the flying height of the slider is in the range of 0.05 to 0.15 μm, and the deformation of the rear end of the slider is 5% or less of the set flying height.

A further object of the present invention is to provide a wafer for making the thin film magnetic head in which the flying height of the slider is in the range of 0.05 to 0.15 μm, and the deformation of the rear end of the slider is 5% or less of the set flying height.

DESCRIPTION OF PREFERRED EMBODIMENTS OF THE INVENTION

Figure 1:
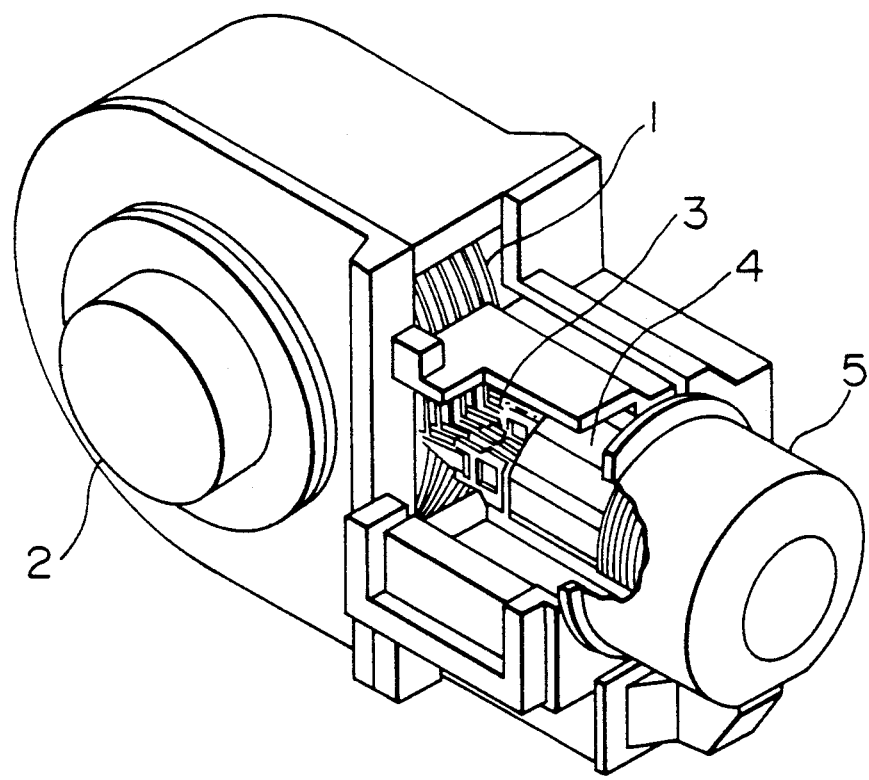
FIG. 1 is a pictorial view illustrating a whole of an example of magnetic disc files.

The objects of the present invention are achieved by using a sintered wafer (substrate) of a metal oxide material containing fluorine. A spinel type oxide material may contain an alkali element or alkaline earth element in place of the fluorine. Furthermore, a $ZrO_2$ material may contain an alkali element or Ba.

The proportion of the fluorine is not less than 0.01 wt % to not more than 2 wt % based on the entire wafer. Furthermore, the proportion of the alkali element or alkaline earth element not less than 0.01 wt % to not more than 8 wt % based on the entire wafer. For the other purposes, additional carbides, nitrides or borides such as SiC, TiC and etc. may be incorporated in such an amount that the proportion of the oxide is not less than 50 vol %, into the wafer. Furthermore, the average grain size of the sintered wafer is preferably 5 μm or smaller.

The spinel type oxide is represented by the general formula of $MR_2O_4$, wherein M is one or more divalent metals selected from Mg, Ca, Sr, Ba, Ni, Co, Mn and etc., and R is one or more trivalent metals selected from Al, Cr, Fe and etc. Furthermore, since a sintered body of pure $ZrO_2$ is easily broken due to phase-transformation, $Y_{2l}O_3$ is normally added to the $ZrO_2$ to form a solid solution which is in a cubic form stable at room temperature The thus obtained stabilized zirconia is generally used.

The present inventors have found that a metal oxide material containing fluorine added thereto is sintered to form a sintered body of the metal oxide containing grain boundaries which are easily broken. If grain boundaries are easily broken, the sintered body is preferentially broken at the boundaries, when a grinder cuts the sintered body. Thus, cuttings are easily formed and machining resistance is reduced. Therefore, machinability is good. Furthermore, the deformation of a grinder in machining or the residual stress of a slider when machined is considerably decreased Accordingly, the deformation of a slider contributed to by the deformation of a grinder and/or the residual stress of a slider is also remarkably decreased. Chipping occurring at the edges of a slider is less as the machining resistance is reduced. Furthermore, since cracks are easy to propagate along the grain boundaries, the chipping easily occurs at a unit of grain. Therefore, the size of chippings is smaller as crystal grain size is decreased.

The amount of the fluorine contained is required to be 0.01 wt % or more of the entire body of wafer for obtaining such advantages as mentioned above. If it is too much, the wafer itself is brittle. Therefore, it is desirably 2 wt % or less.

The grain size of the sintered body of wafer is preferably 5 μm or smaller for making smaller size chippings by allowing cracks to detour as mentioned above.

In the case of the spinel type oxide material, use of an alkali element or alkaline earth element in place of the fluorine can afford the same advantages. Furthermore, in the case of $ZrO_2$ materials, use of an alkali element or Ba can afford the same advantages. The amount of these elements contained is properly in the range of not less than 0.01 wt % to not more than 8 wt %. Carbides, nitrides or borides such as SiC or TiC may be added in such an amount that they do not exceed 50 vol % of the entire wafer. If they are contained in an amount exceeding 50 vol %, then the advantages of the oxides, for example, good sinterability is unpreferably lost.

When a thin film magnetic head or the wafer for the thin film magnetic head is prepared by using the wafer as mentioned above, the machinability of the wafer is very good.

According to the present invention, wafers of various metal oxides for magnetic heads can easily be prepared with a good precision. Therefore, a small size magnetic head with a high precision can be produced at an improved yield.

As a result, impinging between the magnetic head and the magnetic disc can be avoided at a flying height of a slider is in the range of 0.05 to 0.15 μm. Therefore, writing and reading of information at an area recording density of 100 Mb/in² or more can be stably carried out.

The present invention will be illustrated below with reference to some examples. However, the present invention should not be limited to these examples.

EXAMPLE 1

Figure 2:
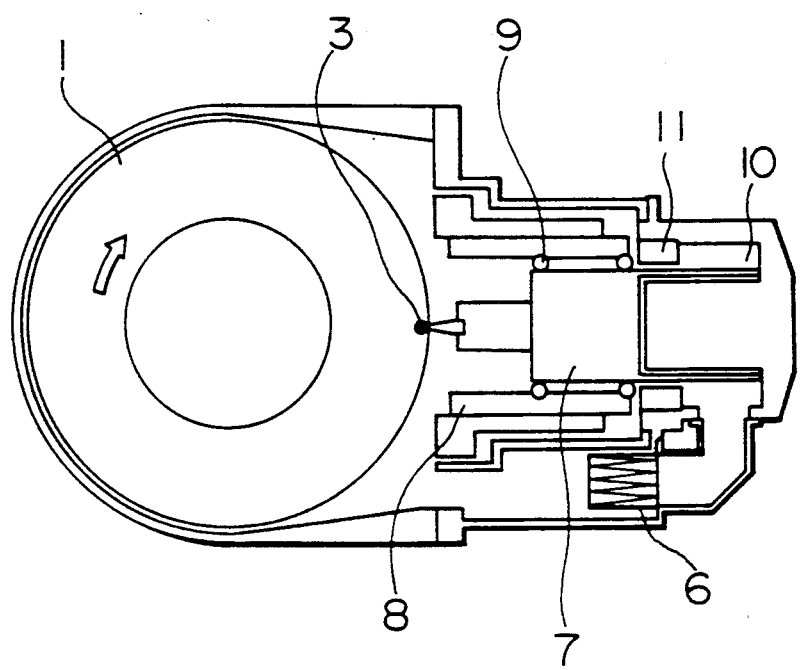
FIG. 2 is a plan view of the magnetic disc file as shown in FIG. 1.

FIGS. 1 and 2 are pictorial views showing the whole and plane, respectively, of an example of the magnetic disc files according to the present invention. The magnetic disc file of this example was comprised of a magnetic disc 1 for recording information, a DC motor 2 for rotating this disc, a magnetic head 3 for writing or reading the information, an actuator 4 and voice coil motor 5 for supporting the head and changing the position of the head in relation to the magnetic disc, and an air filter 6 for maintaining the interior of the file clean. The actuator was comprised of a carriage 7, rail 8 and bearing 9. The voice coil motor was comprised of a voice coil 10 and magnet 11. In the example as shown in FIGS. 1 and 2, 8 plates of the magnetic disc were mounted on the same rotary axis to increase a total storage capacity.

Figure 3:
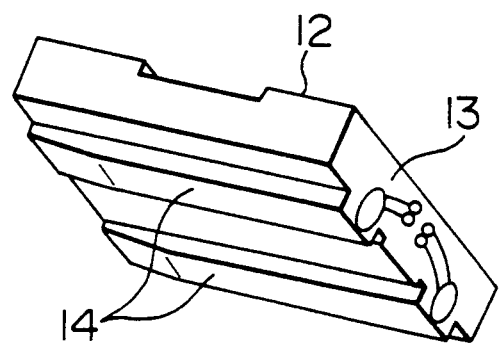
FIG. 3 is a pictorial view of an example of magnetic heads.
Figure 5:
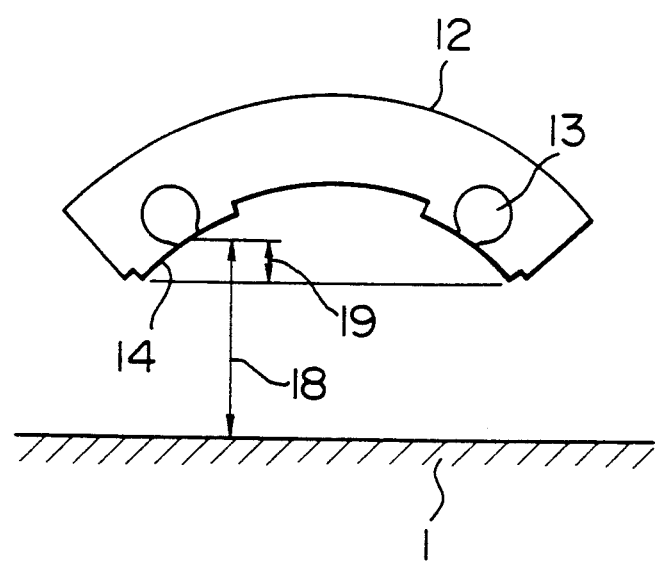
FIG. 5 is a schematical view of the back side of a deformed slider in a flying state.
Figure 4:
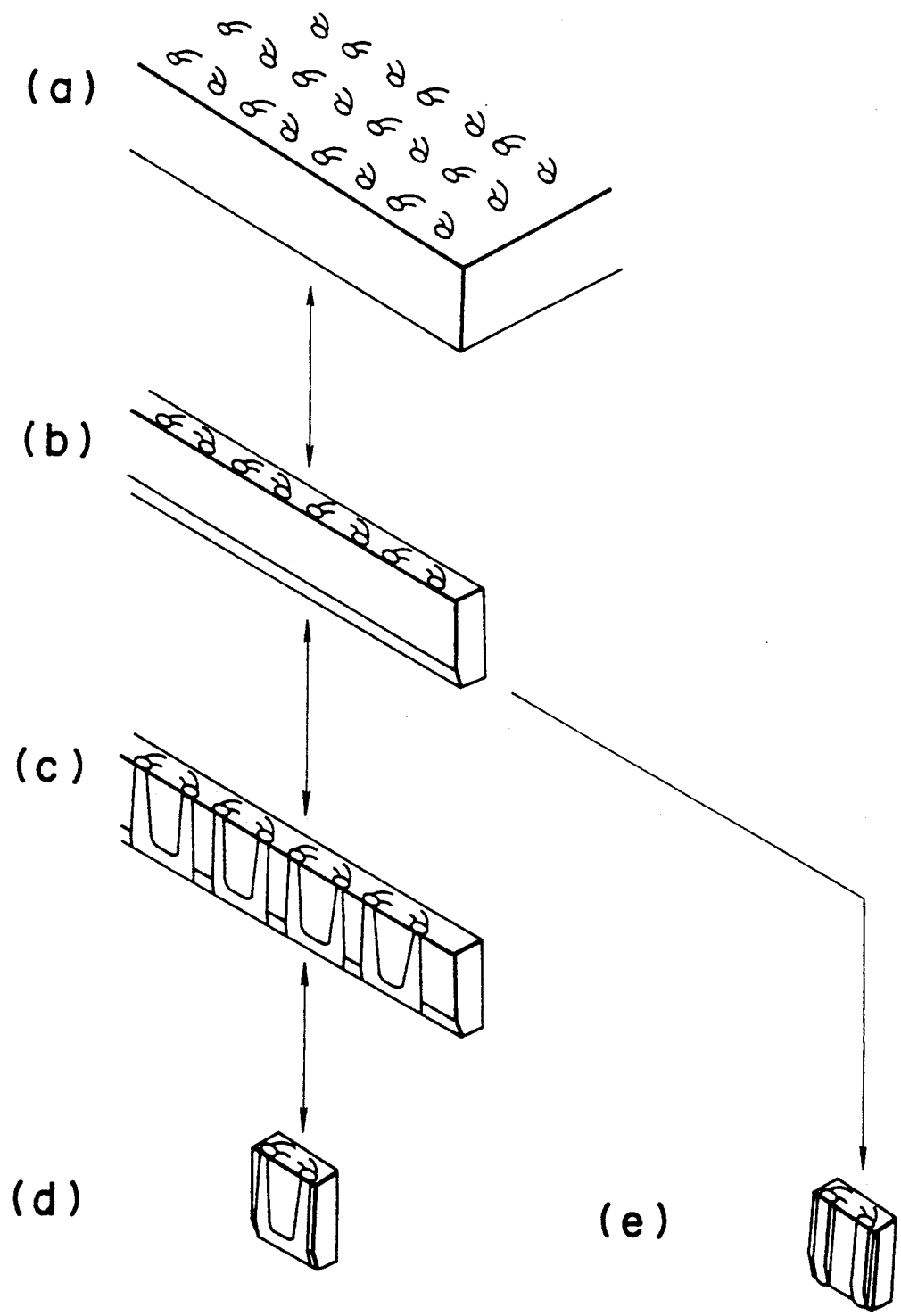
FIG. 4 is a flow chart illustrating the process steps of the magnetic head

FIG. 3 is a pictorial view of an example of the present invention, i.e., a tapered flat-type magnetic head which was comprised of a slider 12 and magnetic head elements 13 formed on the part of the surface of said slider.

In this example, a track density was set to 2,000 T/in, a bit density to 50 kb/in, and a recording wavelength to 1.4 μm, in order to obtain an are recording density of 100 Mb/in². For this, the magnetic head element was prepared to have a gap width of 10 μm. Furthermore, the magnetic disc used had a magnetic layer of 0.06 μm thick and which comprised Co-containing sputtered type magnetic layer having a coercivity of 1,600 Oe. Furthermore, the designed flying height of the slider was set to 0.10 μm. For this, the width of the flying face of the slider was machined in 0.26 mm.

Table 1 shows the slider material used and the deformation amount of the machined slider measured. 10 magnetic heads of each of the thus obtained magnetic heads were built in the magnetic disc file and allowed to fly by rotating the magnetic disc. The writing and reading properties were examined. A so-called over-writing property was in a good range of −23 to −27 dB. This was found to be usable as a store.

Next, each magnetic head was reciprocated between the outside periphery and the inside periphery of the magnetic disc, i.e., the so-called seeking operation was repeated. After this repeating was made 10,000 times, the magnetic disc was removed out. Superficial scratches were investigated detailedly. The proportion of the magnetic discs having scratches thereon is shown in Table 1. There were found no scratches on the disc in the case that the amount of the slider deformation was 0.005 μm which was 5% of the designed flying height of the slider, and there were scratches on the disc when the amount of deformation exceeded 5%. That is, it was found that, if the amount of deformation exceeded 5%, the magnetic head impinged on the magnetic disc.

The similar results to the above were obtained by a negative-pressure type slider.

TABLE 1

| Slider Material | Amount of Slider Deformation (μm) | Proportion of Magnetic Disc with Scratches | Notes |
| --- | --- | --- | --- |
| $MgAl_2O_4$ | 0.020 | 4/10 | Comp. Example |
| $Al_2O_3$— 30 vol % TiC | 0.010 | 2/10 | Comp. Example |
| ($ZrO_2$—9 mol % $Y_2O_3$)— 2 wt % BaO | 0.007 | 1/10 | Comp. Example |
| ($ZrO_2$—9 mol % $Y_2O_3$)— 5 vol % $Al_2O_3$— 5 vol % TiC— 2 wt % $BaF_2$ | 0.005 | 0/10 | The invention |
| $MgAl_2O_4$— 30 vol % SiC— 2 wt % $BaF_2$ | 0.003 | 0/10 | The invention |
| $Al_2O_3$— 30 vol % TiC— 2 wt % $BaF_2$ | 0.002 | 0/10 | The invention |

EXAMPLE 2

In the magnetic disc file of EXAMPLE 1, a track density was set to 3,000 T/in, a bit density to 100 kb/in, and a recording wavelength to 0.65 μm, in order to obtain an area recording density of 300 Mb/in². For this, the magnetic head element was prepared to have a gap width of 6 μm. Furthermore, the magnetic disc used had a magnetic layer of 0.05 μm thick and which comprised a Co-containing sputtered type magnetic layer having a coercivity of 1,650 Oe. Furthermore, the designed flying height of the slider was set to 0.05 μm. For this, the width of the flying face of the slider was machined in 0.21 mm. The same slider materials as those same manner as in EXAMPLE 1.

As a result, an overwriting property was in a good range of −23 to −27 dB in the area recording density of 300 Mb/in² Scratches on the surface of the magnetic disc after seeking operation were searched and the result is shown in Table 2. From this table, it is found that there were no scratches on the disc when the amount of the slider deformation was below 0.0025 μm, i.e., below 5% of the designed flying height, and there were scratches if this amount exceeded 5%. That is, the magnetic disc impinged on the magnetic head when the deformation amount exceeded 5%.

The similar results to the above were obtained by a negative-pressure type slider.

TABLE 2

| Slider Material | Amount of Slider Deformation (μm) | Proportion of Magnetic Disc with Scratches | Notes |
| --- | --- | --- | --- |
| $Al_2O_3$— 30 vol % TiC | 0.008 | 3/10 | Comp. Example |
| ($ZrO_2$—9 mol % $Y_2O_3$)— 2 wt % $BaF_2$ | 0.006 | 2/10 | Comp. Example |
| ($ZrO_2$—9 mol % $Y_2O_3$)— 5 vol % $Al_2O_3$— 5 vol % TiC— 2 wt % $BaF_2$ | 0.004 | 1/10 | Comp. Example |
| $MgAl_2O_4$— 30 vol % SiC— 2 wt % $BaF_2$ | 0.002 | 0/10 | The invention |
| $Al_2O_3$— 30 vol % TiC— 2 wt % $BaF_2$ | 0.002 | 0/10 | The invention |

EXAMPLE 3

Figure 6:
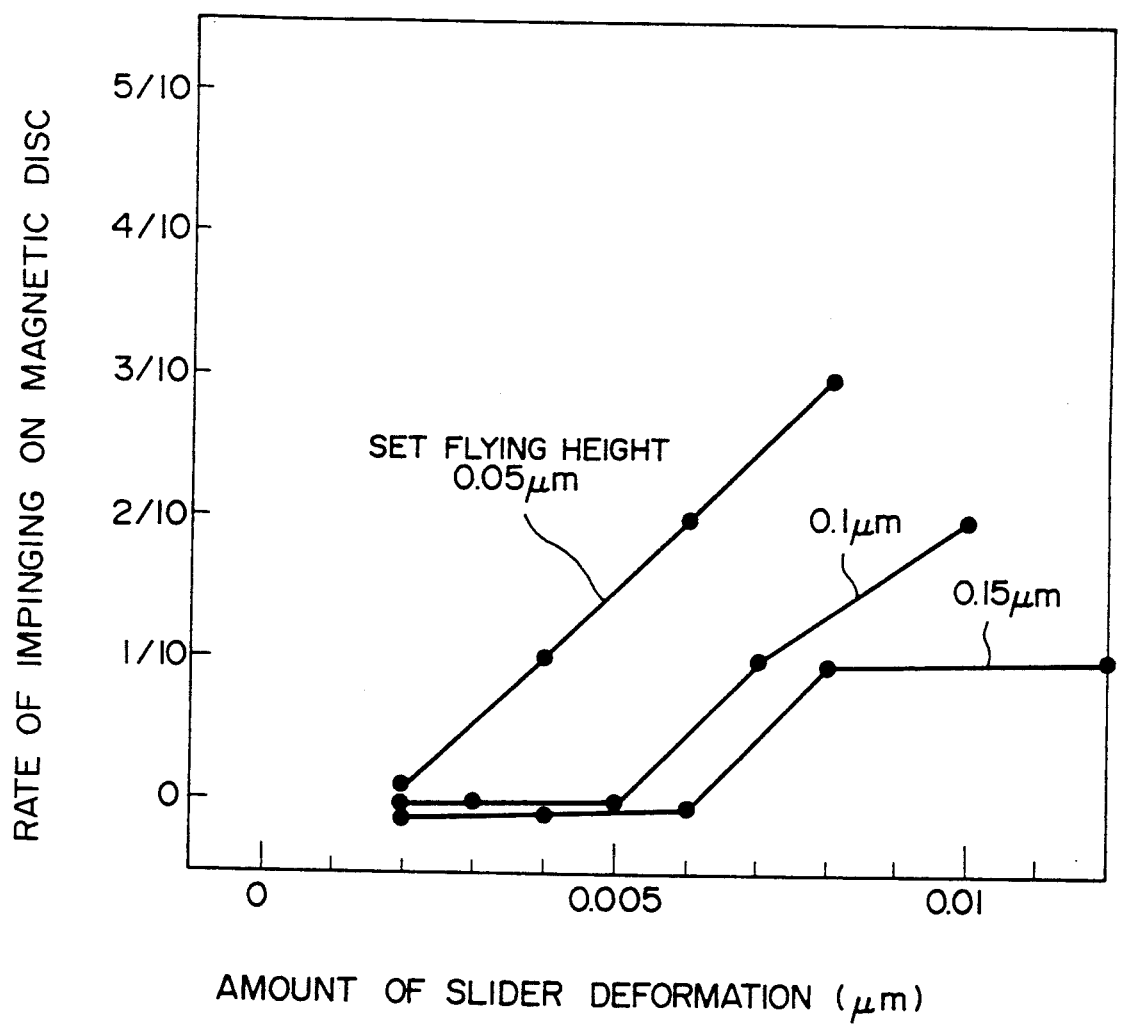
FIG. 6 is a graph showing a relationship between the amount of a slider deformation and a rate at which the slider impinges on a magnetic disc.

It was examined whether or not the magnetic disc and the slider impinged on each other, in the same manner as in EXAMPLES 1 and 2, in the case that the set flying height was 0.15 μm. As a result, the similar results to those in EXAMPLES 1 and 2 were obtained in this example. These results are shown in FIG. 6 together with the results of EXAMPLES 1 and 2. This figure shows a relationship between the amount of the slider deformation and the rate at which said slider impinged on the magnetic disc in the case of a designed flying height in a range of 0.05 to 0.15 μm. From this figure, it is found that the magnetic head did not impinge on the magnetic disc when the amount of deformation was below 5%.

EXAMPLE 4

An example of a magnetic head exhibiting a small amount of deformation is described below. In this example, the flying face of a slider had a width of 0.26 mm.

Firstly, a method of producing an $Al_2O_3$ slider material is described.

Table 3 shows compositions of raw material mixtures, each of which was uniformly mixed with water as medium by a ball mill for 10 to 50 hours, and then greater particles were ground. Table 3 also shows a composition containing TiC. Since addition of TiC provides an effect that the grain size are made smaller, it is possible to add TiC in such an amount that the volume of $Al_2O_3$ is less than 50%. In Nos. 12 and 13, CaO and BaO, respectively, were added in a carbonate form.

The resultant slurry was dried under agitation and then charged into a metal mold and compacted.

The resultant compact was hot press sintered in a furnace containing an inert gas atmosphere at the temperature as shown in Table 3 for 30 minutes. The pressure of the hot pressing was 400 $kgf/cm^2$. The surface of the resultant sintered body was mirror-like polished to a maximum surface roughness of 0.1 μm to form a substrate for a thin film magnetic head.

A part of the substrate was cut, etched and examined for the grain size thereof. The etched section was observed by a scanning electron microscope. The average grain size was determined by the intercept method. The results are shown in Table 3. For the compositions according to the present invention, it was about 1.5 μm when TiC was added, and about 3.0 μm when TiC was not added. In both the cases, the grain size was lower than 5 μm. The grain size may be controlled by changing the sintering temperature. The grain size of prior art materials is about 3 μm, which is approximately identical with that of the present invention.

Then, the amount of fluorine retained in the substrate was analyzed. The results are shown in Table 3. In all the cases, it was within the range of 0.37 to 0.85 wt %, which falls within the scope of the present invention. This broad range of the residual amount of the additive is considered to be contributed to by change in melting point, vapor pressure and atomic weight. Examination of the position of fluorine by an electron microscope revealed that the fluorine was partially segregated at the grain boundaries of $Al_2O_3$.

A thin film magnetic head as shown in FIG. 3 was made from the substrate. This magnetic head was constituted by a slider 12 made from the sintered body above and a magnetic head element 13. In the step of machining the slider to form slider channels, chipping should be noted. Therefore, the maximum size of chippings produced at the ridges of channels machined in the substrate with a diamond grinder of #1500 was examined. The feed rate of the grinder was 0.3 mm/sec. For comparison of machining resistance the consumed electrical power of the rotary wheel of the grinder during the machining was determined with relative values. The results are shown in Table 3. It is seen that the fluorine-containing materials according to the present invention had a smaller chipping size and lower machining resistance than those of the prior art materials, $Al_2O_3$-TiC (Nos. 11 to 13). Then, the amount of the slider deformation was also examined The results are shown in Table 3. It is seen that the material of the present invention having a lower machining resistance had a very small amount of deformation. That is, use of the fluorine-containing material according to the present invention can reduce the size of chippings produced when the material is machined in the thin film magnetic head. The machining can be carried out with precision. Furthermore, from the comparison of Nos. 7 and 9 with Nos. 12 and 13 it is seen that the effective element of $BaF_2$ and $CaF_2$ added to the $Al_2O_3$ was not Ba and Ca but fluorine.

TABLE 3

| No. | Composition | Sintering Temp. (°C.) | Grain Size (μm) | F Content (wt %) | Max. Size of Chippings (μm) | Machining Resistance (relative) | Amount of Slider Deformation (μm) | Notes |
|---|---|---|---|---|---|---|---|---|
| 1 | $Al_2O_3$—2 wt % $MgF_2$ | 1500 | 3.2 | 0.73 | 4.4 | 7.0 | 0.003 | The Invention |
| 2 | $Al_2O_3$—2 wt % $CaF_2$ | 1500 | 3.1 | 0.84 | 4.3 | 7.1 | 0.003 | The Invention |
| 3 | $Al_2O_3$—2 wt % $SrF_2$ | 1500 | 3.3 | 0.56 | 4.4 | 7.2 | 0.003 | The Invention |
| 4 | $Al_2O_3$—2 wt % $BaF_2$ | 1500 | 3.5 | 0.38 | 4.3 | 6.8 | 0.003 | The Invention |
| 5 | $Al_2O_3$—2 wt % LiF | 1500 | 2.9 | 0.37 | 4.0 | 7.2 | 0.003 | The Invention |
| 6 | $Al_2O_3$—30 vol % TiC—2 wt % $MgF_2$ | 1500 | 1.5 | 0.72 | 2.3 | 6.9 | 0.002 | The Invention |
| 7 | $Al_2O_3$—30 vol % TiC—2 wt % $CaF_2$ | 1500 | 1.6 | 0.85 | 2.1 | 7.3 | 0.002 | The Invention |
| 8 | $Al_2O_3$—30 vol % TiC—2 wt % $SrF_2$ | 1500 | 1.4 | 0.55 | 2.0 | 7.1 | 0.002 | The Invention |
| 9 | $Al_2O_3$—30 vol % TiC—2 wt % $BaF_2$ | 1500 | 1.3 | 0.39 | 2.3 | 7.0 | 0.002 | The Invention |
| 10 | $Al_2O_3$—30 vol % TiC—2 wt % LiF | 1500 | 1.5 | 0.38 | 2.1 | 7.2 | 0.002 | The Invention |
| 11 | $Al_2O_3$—30 vol % TiC | 1600 | 2.9 | | 8.8 | 15 | 0.010 | Comp. Ex. |
| 12 | $Al_2O_3$—2 wt % CaO | 1600 | 3.1 | | 7.5 | 13 | 0.010 | Comp. Ex. |
| 13 | $Al_2O_3$—2 wt % BaO | 1600 | 3.1 | | 7.6 | 13 | 0.010 | Comp. Ex. |

EXAMPLE 5

An example of a spinel type oxide slider material is described below.

Raw materials having the compositions as shown in Table 4 were sintered in the same manner as in EXAMPLE 4 to form substrates which were then examined.

Table 4 shows compositions containing SiC. Since addition of SiC provides an effect that the grain size are made smaller, it is possible to add SiC in such an amount that the volume of the spinel is less than 50 vol % $Li_2O$, CaO and BaO were added in a carbonate form in Nos. 19, 25, 28, 31, 34, 37, 40 and 43 to 45. The results are shown in Table 4. The grain size of the fluorine-containing materials according to the present invention was about 1.5 μm when SiC was added and about 3 μm when SiC was not added. In both the cases, the size was lower than 5 μm. The grain size can be controlled by changing the sintering temperature. The grain size of prior art materials (Nos. 46 and 47) is about 3 μm, which is approximately identical with that of the present invention.

Furthermore, ten substrates were analyzed for the added alkali elements or alkaline earth elements and fluorine retained therein. However, the analysis of the fluorine was converted to the amount of the alkaline earth element in the case that the alkaline earth element added was the same as that of the spinel (Nos. 14, 20, 27 and 30), because they could not be separated from each other. The results are shown in Table 4. In all the cases, the amounts of the alkali elements and alkaline earth elements were 0.14 to 1.4 wt %, and the amount of fluorine was 0.3 to 0.8 wt %, which all fall within the scope of the present invention. This broad range of the residual amount of the additive is considered to be contributed to by change in melting point, vapor pressure and atomic weight. Examination of the position of the above element by an electron microscope revealed that those were partially segregated at the grain boundaries of the spinel crystal grains.

Thin film magnetic heads as shown in FIG. 3 were made from the substrates. In the step of machining the slider to form slider channels, chipping should be noted. Therefore, the maximum size of chippings produced at the ridges of channels machined in the substrate with a diamond grinder of #1500 was examined. The feed rate of the grinder was 0.2 mm/sec. Machining resistance was compared by relative values. The results are shown in Table 4. It is seen that the amount of chippings of the fluorine-containing material according to the present invention is extremely reduced as compared with that of a prior art material, $MgAl_2O_4$ (No. 46), and the machining resistance of said fluorine-containing material is lower than that of $Al_2O_3$-TiC (No. 47). Then, the amount of the slider deformation was determined. The results are also shown in Table 4. It is seen that the flurine-containing material has a smaller amount of deformation as the machining resistance is lower. Furthermore, in the case of the spinel type oxide, it is seen that incorporation of an alkali element or alkaline earth element such as Li, Ba and Ca in place of fluorine affords the same advantages as afforded by incorporation of fluorine (Nos. 19, 25, 28, 31, 37, 40 and 43 to 45).

TABLE 4

| No. | Composition | Sintering Temp. (°C.) | Grain Size (μm) | Amount of Residual Alkali and Alkaline Earth (wt %) | Amount of Residual F (wt %) | Max. Size of Chippings (μm) | Machining Resistance (relative) | Amount of Slider Deformation (μm) | Notes |
|---|---|---|---|---|---|---|---|---|---|
| 14 | $MgAl_2O_4$—2 wt % $MgF_2$ | 1450 | 3.3 | 0.5 | 0.8 | 4.2 | 7.2 | 0.005 | The Invention |
| 15 | $MgAl_2O_4$—2 wt % $CaF_2$ | 1450 | 3.0 | 0.9 | 0.8 | 4.0 | 7.0 | 0.005 | The Invention |
| 16 | $MgAl_2O_4$—2 wt % $SrF_2$ | 1450 | 3.5 | 1.3 | 0.5 | 4.3 | 7.8 | 0.005 | The Invention |
| 17 | $MgAl_2O_4$—2 wt % $BaF_2$ | 1450 | 3.2 | 1.2 | 0.3 | 4.1 | 7.1 | 0.005 | The Invention |
| 18 | $MgAl_2O_4$—2 wt % LiF | 1450 | 2.8 | 0.14 | 0.7 | 3.9 | 7.1 | 0.005 | The Invention |
| 19 | $MgAl_2O_4$—2 wt % $Li_2O$ | 1450 | 3.2 | 0.9 |  | 4.1 | 7.0 | 0.005 | The Invention |
| 20 | $MgAl_2O_4$—30 vol % SiC—2 wt % $MgF_2$ | 1450 | 1.6 | 0.5 | 0.8 | 2.2 | 7.1 | 0.003 | The Invention |
| 21 | $MgAl_2O_4$—30 vol % SiC—2 wt % $MgF_2$ | 1450 | 1.4 | 0.9 | 0.8 | 2.1 | 6.8 | 0.003 | The Invention |
| 22 | $MgAl_2O_4$—30 vol % SiC—2 wt % $SrF_2$ | 1450 | 1.3 | 1.3 | 0.6 | 1.9 | 7.1 | 0.003 | The Invention |
| 23 | $MgAl_2O_4$—30 vol % SiC—2 wt % $BaF_2$ | 1450 | 1.5 | 1.2 | 0.3 | 2.2 | 7.2 | 0.003 | The Invention |
| 24 | $MgAl_2O_4$—30 vol % SiC—2 wt % LiF | 1450 | 1.6 | 0.14 | 0.7 | 2.0 | 6.9 | 0.003 | The Invention |
| 25 | $MgAl_2O_4$—30 vol % SiC—2 wt % $Li_2O$ | 1450 | 1.5 | 0.9 |  | 1.9 | 7.0 | 0.003 | The Invention |
| 26 | $BaAl_2O_4$—2 wt % $CaF_2$ | 1450 | 3.5 | 0.9 | 0.8 | 4.3 | 7.1 | 0.005 | The Invention |
| 27 | $BaAl_2O_4$—2 wt % $BaF_2$ | 1450 | 3.2 | 1.2 | 0.3 | 4.1 | 6.8 | 0.005 | The Invention |
| 28 | $BaAl_2O_4$—2 wt % $Li_2O$ | 1450 | 3.3 | 0.9 |  | 4.2 | 7.0 | 0.005 | The Invention |
| 29 | $BaAl_2O_4$—30 vol % SiC—2 wt % $CaF_2$ | 1450 | 1.5 | 0.9 | 0.8 | 2.1 | 7.2 | 0.003 | The Invention |
| 30 | $BaAl_2O_4$—30 vol % SiC—2 wt % $BaF_2$ | 1450 | 1.4 | 1.2 | 0.3 | 2.0 | 6.9 | 0.003 | The Invention |
| 31 | $BaAl_2O_4$—30 vol % SiC—2 wt % $Li_2O$ | 1450 | 1.6 | 0.9 |  | 2.1 | 7.1 | 0.003 | The Invention |
| 32 | $MnAl_2O_4$—2 wt % $CaF_2$ | 1450 | 3.2 | 0.9 | 0.8 | 4.2 | 7.2 | 0.005 | The Invention |
| 33 | $MnAl_2O_4$—2 wt % $BaF_2$ | 1450 | 3.0 | 1.2 | 0.3 | 4.2 | 6.8 | 0.005 | The Invention |
| 34 | $MnAl_2O_4$—2 wt % $Li_2O$ | 1450 | 3.4 | 0.9 |  | 4.3 | 6.9 | 0.005 | The Invention |
| 35 | $MnAl_2O_4$—30 vol % SiC—2 wt % $CaF_2$ | 1450 | 1.5 | 0.9 | 0.8 | 2.0 | 7.0 | 0.003 | The Invention |
| 36 | $MnAl_2O_4$—30 vol % SiC—2 wt % $BaF_2$ | 1450 | 1.4 | 1.2 | 0.3 | 2.2 | 7.1 | 0.003 | The Invention |
| 37 | $MnAl_2O_4$—30 vol % SiC—2 wt % $Li_2O$ | 1450 | 1.5 | 0.9 |  | 1.9 | 6.8 | 0.003 | The Invention |
| 38 | $MgCr_2O_4$—2 wt % $CaF_2$ | 1450 | 3.2 | 0.9 | 0.8 | 4.2 | 7.1 | 0.005 | The Invention |

TABLE 4-continued

| No. | Composition | Sintering Temp. (°C.) | Grain Size (μm) | Amount of Residual Alkali and Alkaline Earth (wt %) | Amount of Residual F (wt %) | Max. Size of Chippings (μm) | Machining Resistance (relative) | Amount of Slider Deformation (μm) | Notes |
| --- | --- | --- | --- | --- | --- | --- | --- | --- | --- |
| 39 | $MgCr_2O_4$—2 wt % $BaF_2$ | 1450 | 3.0 | 1.2 | 0.3 | 4.1 | 6.9 | 0.005 | The Invention |
| 40 | $MgCr_2O_4$—2 wt % $Li_2O$ | 1450 | 2.9 | 0.9 | | 4.0 | 7.1 | 0.005 | The Invention |
| 41 | $MgCr_2O_4$—30 vol % SiC— 2 wt % $CaF_2$ | 1450 | 1.4 | 0.9 | 0.8 | 2.0 | 7.0 | 0.003 | The Invention |
| 42 | $MgCr_2O_4$—30 vol % SiC— 2 wt % $BaF_2$ | 1450 | 1.5 | 1.2 | 0.3 | 1.9 | 6.9 | 0.003 | The Invention |
| 43 | $MgCr_2O_4$—30 vol % SiC— 2 wt % $Li_2O$ | 1450 | 1.6 | 0.9 | | 2.2 | 7.2 | 0.003 | The Invention |
| 44 | $MgAl_2O_4$—30 vol % SiC— 2 wt % CaO | 1450 | 1.5 | 1.3 | | 2.2 | 6.9 | 0.003 | The Invention |
| 45 | $MgAl_2O_4$—30 vol % SiC— 2 wt % BaO | 1450 | 1.5 | 1.4 | | 2.2 | 7.2 | 0.003 | The Invention |
| 46 | $MgAl_2O_4$ | 1450 | 3.2 | | | 32.0 | 149.2 | 0.020 | Comp. Ex. |
| 47 | $Al_2O_3$—30 vol % TiC | 1600 | 2.9 | | | 5.5 | 12.3 | 0.010 | Comp. Ex. |

EXAMPLE 6

A slider material comprising $ZrO_2$ is described below.

Raw material powders having the compositions as shown in Table 5 were sintered in the same manner as in EXAMPLE 5 and then examined. As already mentioned, since a stabilizer is needed for stabilizing the crystal phase of $ZrO_2$, $Y_2O_3$ was selected in this example and added in an amount of 9 mol % based on $ZrO_2$. Generally various additives such as TiC, SiC and $Al_2O_3$ may be added in such an amount that $ZrO_2$ or a total of metal oxides is not below 50 vol % of the sintered body. In Nos. 48 and 54, $Li_2O$ and BaO, respectively, were added in a carbonate form.

The results of the examination are shown in Table 5. Various grain sizes in the range of 3.6 to 8.5 were obtained. It is seen from Table 5 that the grain size can be reduced to 5 μm or less by adding TiC or SiC. In No. 57, the grain size was increased to 8.5 μm, in spite of the addition of TiC. Electron microscopic analysis revealed that $BaF_2$ was reacted with $Al_2O_3$ to form a complex oxide of Ba and Al, which formed a liquid phase during the sintering. The liquid phase promoted the grain growth to increase the grain size. The residual amount of fluorine was 0.08 to 0.8 wt %, and the residual amount of Ba and the alkali element was 0.14 to 1.4 wt %, which amounts fall within the scope of the present invention.

The size of chippings by machining is much lower for the fluorine-containing materials than for comparative materials of $ZrO_2$ and $ZrO_2$ plus TiC (Nos. 59 and 60). The same things are applicable to the machining resistance and the amount of the slider deformation. Furthermore, the $ZrO_2$-containing materials may contain an alkali element or Ba in place of fluorine, which afforded the same advantages (Nos. 48 and 54).

TABLE 5

| No. | Composition | Sintering Temp. (°C.) | Grain Size (μm) | Amount of Residual Alkali and Alkaline Earth (wt %) | Amount of Residual F (wt %) | Max. Size of Chippings (μm) | Machining Resistance (relative) | Amount of Slider Deformation (μm) | Notes |
| --- | --- | --- | --- | --- | --- | --- | --- | --- | --- |
| 48 | ($ZrO_2$—9 mol % $Y_2O_3$)— 2 wt % $Li_2O$ | 1400 | 6.2 | 0.9 | | 5.4 | 8.5 | 0.007 | The Invention |
| 49 | ($ZrO_2$—9 mol % $Y_2O_3$)— 2 wt % LiF | 1400 | 6.5 | 0.14 | 0.7 | 5.1 | 8.2 | 0.007 | The Invention |
| 50 | ($ZrO_2$—9 mol % $Y_2O_3$)— 2 wt % $MgF_2$ | 1400 | 6.1 | 0.5 | 0.8 | 5.3 | 8.4 | 0.007 | The Invention |
| 51 | ($ZrO_2$—9 mol % $Y_2O_3$)— 2 wt % $CaF_2$ | 1400 | 6.3 | 0.9 | 0.8 | 5.2 | 8.1 | 0.007 | The Invention |
| 52 | ($ZrO_2$—9 mol % $Y_2O_3$)— 2 wt % $SrF_2$ | 1400 | 6.2 | 1.3 | 0.5 | 5.3 | 8.3 | 0.007 | The Invention |
| 53 | ($ZrO_2$—9 mol % $Y_2O_3$)— 2 wt % $BaF_2$ | 1400 | 6.7 | 1.2 | 0.3 | 5.5 | 8.2 | 0.007 | The Invention |
| 54 | ($ZrO_2$—9 mol % $Y_2O_3$)— 2 wt % BaO | 1400 | 6.6 | 1.4 | | 5.3 | 8.5 | 0.007 | The Invention |
| 55 | ($ZrO_2$—9 mol % $Y_2O_3$)— 5 vol % TiC— 2 wt % $BaF_2$ | 1400 | 4.2 | 1.2 | 0.3 | 4.3 | 7.5 | 0.006 | The Invention |
| 56 | ($ZrO_2$—9 mol % $Y_2O_3$)— 5 vol % TiC— 5 vol % SiC— 2 wt % $BaF_2$ | 1400 | 2.2 | 1.2 | 0.3 | 2.6 | 6.9 | 0.005 | The Invention |
| 57 | ($ZrO_2$—9 mol % $Y_2O_3$)— 5 vol % TiC— 5 vol % $Al_2O_3$— 2 wt % $BaF_2$ | 1400 | 8.5 | 1.2 | 0.3 | 6.8 | 9.5 | 0.005 | The Invention |
| 58 | ($ZrO_2$—9 mol % $Y_2O_3$)— 5 vol % TiC— 5 vol % $Al_2O_3$— 0.5 wt % $BaF_2$ | 1400 | 3.6 | 0.3 | 0.08 | 3.5 | 7.2 | 0.005 | The Invention |
| 59 | ($ZrO_2$—9 mol % $Y_2O_3$) | 1400 | 6.6 | | | 42 | 180 | 0.024 | Comp. Ex. |

TABLE 5-continued

| No. | Composition | Sintering Temp. (°C.) | Grain Size (μm) | Amount of Residual Alkali and Alkaline Earth (wt %) | Amount of Residual F (wt %) | Max. Size of Chippings (μm) | Machining Resistance (relative) | Amount of Slider Deformation (μm) | Notes |
| --- | --- | --- | --- | --- | --- | --- | --- | --- | --- |
| 60 | ($ZrO_2$—9 mol % $Y_2O_3$)— 5 vol % TiC | 1400 | 4.4 | | | 38 | 160 | 0.023 | Comp. Ex. |

EXAMPLE 7

In order to examine the influence of an amount of fluorine, raw materials of the composition as shown in Table 6 were sintered, machined and examined. The results are shown in Table 6. From this table, it is seen that the larger the amount of $BaF_2$ added, the larger the residual amount of fluorine. However, it is seen that the amount of fluorine had no influence on the grain size. As a result, the size of chippings, machining resistance and deformation amount of the slider materials containing less than 0.01 wt % of residual fluorine were large. Thus, such slider materials were not proper (Nos. 67 and 71). In the case of the amount of residual fluorine being greater than 2 wt %, on the other hand, the machining resistance and the amount of deformation were slightly reduced, but the size of chippings became greater (Nos. 70 and 74). When the residual amount of fluorine was more than 2 wt %, the sintered body became brittle. The slidability of the head with the disc were almost unchanged.

From the foregoing it is clear that the residual amount of fluorine should be within the range of not less than 0.01 wt % but not more than 2 wt % in respect of the machinability. The same things are applicable to the oxides other than $ZrO_2$.

EXAMPLE 8

Raw materials having the compositions as shown in Table 7 were sintered, machined and examined for investigating the influence of an alkali element and alkaline earth element on the slider. $Li_2O$ and BaO were added in a carbonate form. The results are shown in Table 7. From this table, it is seen that the residual amounts of Li and Ba are increased as the amounts of $Li_2O$ and BaO added are increased. However, the amounts of Li and Ba had no influence on the grain size. As a result, the size of chippings, machining resistance and amount of the slider deformation became greater in the case of the residual amounts of Li and Ba being less than 0.01 wt %. Thus, no good materials were obtained (Nos. 75 and 79). On the other hand, the machining resistance and amount of the slider deformation were slightly reduced but the size of chippings was greater in the case of the amounts of Li and Ba being more than 8 wt % (Nos. 78 and 82). Thus, it is seen that if the residual amounts of Li and Ba are 8 wt %, the sintered body is brittle. The slidability of the slider with the disc was almost the same in all the cases above.

From the foregoing it is clear that the residual amounts of Li and Ba should be within the range of not less than 0.01 wt % and not more than 8 wt % in respect

TABLE 6

| No. | Composition | Sintering Temp. (°C.) | Grain Size (μm) | F Content (wt %) | Max. Size of Chippings (μm) | Machining Resistance (relative) | Amount of Slider Deformation (μm) | Notes |
| --- | --- | --- | --- | --- | --- | --- | --- | --- |
| 67 | $Al_2O_3$—0.03 wt % $BaF_2$ | 1500 | 3.4 | 0.006 | 13 | 35 | 0.013 | Comp. Ex. |
| 68 | $Al_2O_3$—0.05 wt % $BaF_2$ | 1500 | 3.5 | 0.01 | 4.6 | 7.0 | 0.003 | The Invention |
| 69 | $Al_2O_3$—10 wt % $BaF_2$ | 1500 | 3.5 | 2.0 | 4.6 | 7.0 | 0.003 | The Invention |
| 70 | $Al_2O_3$—13 wt % $BaF_2$ | 1500 | 3.4 | 2.5 | 8.9 | 5.1 | 0.003 | Comp. Ex. |
| 71 | $Al_2O_3$—30 vol % TiC 0.03 wt % $BaF_2$ | 1500 | 1.4 | 0.006 | 7.6 | 13 | 0.010 | Comp. Ex. |
| 72 | $Al_2O_3$—0.03 vol % TiC 0.05 wt % $BaF_2$ | 1500 | 1.3 | 0.01 | 2.2 | 7.1 | 0.002 | The Invention |
| 73 | $Al_2O_3$—0.03 vol % TiC 10 wt % $BaF_2$ | 1500 | 1.3 | 2.0 | 2.1 | 6.9 | 0.002 | The Invention |
| 74 | $Al_2O_3$—0.03 vol % TiC 13 wt % $BaF_2$ | 1500 | 1.2 | 2.5 | 9.2 | 5.2 | 0.002 | Comp. Ex. | to the machinability. The same things are applicable not only to the case of Li and Ba but also to the case of Mg, Ca, Sr and etc. and furthermore to the case of Li and Ba added to $ZrO_2$.

TABLE 7

| No. | Composition | Sintering Temp. (°C.) | Grain Size (μm) | Amount of Residual Alkali and Alkaline Earth (wt %) | Max. Size of Chippings (μm) | Machining Resistance (relative) | Amount of Slider Deformation (μm) | Notes |
| --- | --- | --- | --- | --- | --- | --- | --- | --- |
| 75 | $MgAl_2O_4$—0.013 wt % $Li_2O$ | 1450 | 3.1 | 0.006 | 13 | 49 | 0.016 | Comp. Ex. |
| 76 | $MgAl_2O_4$—0.02 wt % $Li_2O$ | 1450 | 3.0 | 0.01 | 4.2 | 7.2 | 0.005 | The Invention |
| 77 | $MgAl_2O_4$—17 wt % $Li_2O$ | 1450 | 3.2 | 8 | 4.3 | 7.0 | 0.005 | The Invention |
| 78 | $MgAl_2O_4$—19 wt % $Li_2O$ | 1450 | 3.1 | 9 | 11 | 5.1 | 0.004 | Comp. Ex. |
| 79 | $MgAl_2O_4$—30 vol % SiC— 0.007 wt % BaO | 1450 | 1.4 | 0.006 | 12 | 6.2 | 0.003 | Comp. Ex. |
| 80 | $MgAl_2O_4$—30 vol % SiC— 0.01 wt % BaO | 1450 | 1.6 | 0.01 | 2.2 | 7.3 | 0.003 | The Invention |

TABLE 7-continued

| No. | Composition | Sintering Temp. (°C.) | Grain Size (μm) | Amount of Residual Alkali and Alkaline Earth (wt %) | Max. Size of Chippings (μm) | Machining Resistance (relative) | Amount of Slider Deformation (μm) | Notes |
| --- | --- | --- | --- | --- | --- | --- | --- | --- |
| 81 | MgAl$_2$O$_4$—30 vol % SiC—9 wt % BaO | 1450 | 1.5 | 8 | 2.3 | 7.2 | 0.003 | The Invention |
| 82 | MgAl$_2$O$_4$—30 vol % SiC—10 wt % BaO | 1450 | 1.5 | 9 | 11 | 5.5 | 0.002 | Comp. Ex. |

What is claimed is:

1. A magnetic disc file which comprises
a thin film magnetic disc for recording information,
a means for rotating said thin film magnetic disc,
a magnetic head for writing and reading information, said head being provided with a flying slider having opposing major surfaces, one of said major surface comprising a flying face facing said thin form magnetic disc, and said flying slider having a magnetic head element at one end thereof which connects said opposing major surfaces; and
a means for supporting said magnetic head and changing the position of said head in respect to said thin film magnetic disc,
the flying height of said flying slider from said thin film magnetic disc during operation being set by said means for supporting said magnetic head and changing the position of said magnetic head in the range of 0.05 to 0.15 μm, and
a distance from a base line to an end of said magnetic head element being not more than 5% of said flying height, said base line connecting edges of said flying face at said one end of said flying slider which are furthest from one another, such that said flying slider is not in contact with said thin film magnetic disc during the writing and reading operation on said thin film magnetic disc.

2. The magnetic disc file according to claim 1, wherein an area recording density on said thin film magnetic disc is 100 Mb/in$^2$ or more.

3. The magnetic disc file according to claim 1, wherein said slider is of a negative-pressure type.

4. The magnetic disc file according to claim 1, wherein the magnetic film of said thin film magnetic film disc has a thickness of 400 to 1,00 Å.

5. A magnetic disc file which comprises
a thin film magnetic disc for recording information,
a means for rotating said thin film magnetic disc,
a magnetic head for writing and reading information, said head being provided with a flying slider, and
a means for supporting said magnetic head and changing the position of said head in respect of said thin film magnetic disc,
said slider being a sintered body containing a metal oxide or oxides in an amount of 50 vol % or more based on the total of said body and containing 0.01 wt % to 2 wt % of fluorine based on the total of said body.

6. The magnetic disc file according to claim 5, wherein said sintered body of the slider further contains at least titanium carbide or silicon carbide in addition to said oxide or oxides.

7. The magnetic disc file according to claim 5 or 6, wherein said sintered body of the slider contains aluminum oxide as said metal oxide.

8. The magnetic disc file according to claim 7, wherein said sintered body of the slider contains 0.01 wt % to 8 wt % based on the total of said body, of an alkali element or Ba in place of said fluorine.

9. The magnetic disc file according to claim 5 or 6, wherein said sintered body of the slider contains stabilized zirconia, ZrO$_2$ as said metal oxide.

10. The magnetic disc file according to claim 9, wherein said sintered body of the slider contains 0.01 wt % to 8 wt % based on the total of said body, of an alkali element or Ba in place of said fluorine.

11. The magnetic disc file according to claim 5 or 6, wherein said sintered body of the slider contains a spinel type oxide as said metal oxide.

12. The magnetic disc file according to claim 11, wherein said spinel type oxide is a reaction product of an oxide or oxides of at least one element selected from Mg, Ca, Sr, Ba, Ni, Co and Mn and an oxide or oxides of at least one element selected from Al, Cr and Fe.

13. The magnetic disc file according to claim 12, wherein said sintered body of the slider contains 0.01 wt % to 8 wt % based on the total of said body, of an alkali or alkaline earth element in place of said fluorine.

14. The magnetic disc file according to claim 11, wherein said sintered body of the slider contains 0.01 wt % to 8 wt % based on the total of said body, of an alkali or alkaline earth element in place of said fluorine.

15. The magnetic disc file according to claim 14, wherein said sintered body contains Li as said alkali element and at least one element selected from Mg, Ca, Sr and Ba as said alkaline earth element.

16. The magnetic disc file according to claim 5, wherein said sintered body consists essentially of material having an average grain size of 5 μm or smaller.

17. The magnetic disc file according to claim 5, wherein a flying height of said flying slider from said thin film magnetic disc during writing and reading information is set by said means for supporting said magnetic head and changing the position of said magnetic head in a range of 0.05 to 0.15 μm.

18. The magnetic disc file according to claim 1, wherein said flying slider is a sintered body containing metal oxide in an amount of 50 vol % or more and containing 0.01 to 2 wt % of fluorine.

19. The magnetic disc file according to claim 18, wherein said sintered body of the slider contains aluminum oxide as said metal oxide.

20. The magnetic disc file according to claim 18, wherein said sintered body of the slider contains a spinel type oxide as said metal oxide.

21. The magnetic disc file according to claim 20, wherein said spinel type oxide is a reaction product of an oxide or oxides of at least one element selected from Mg, Ca, Sr, Ba, Ni, Co and Mn and an oxide or oxides of at least one element selected from Al, Cr and Fe.

22. The magnetic disc file according to claim 21, wherein said sintered body of the slider contains 0.01 wt % to 8 wt % based on the total of said body, of an alkali or alkaline earth element in place of said fluorine.

23. The magnetic disc file according to claim 18, wherein said sintered body of the slider contains stabilized zirconia, $ZrO_2$, of said metal oxide.

24. The magnetic disc file according to claim 23, wherein said sintered body of the slider contains 0.01 wt % to 8 wt % based on the total of said body, of an alkali element or Ba in place of said fluorine.

25. The magnetic disc file according to claim 18, wherein said sintered body consists essentially of material having an average grain size of 5 μm or smaller.

* * * * *